March 1, 1927.                F. E. WELLMAN                1,619,553
                           LIQUID LEVEL INDICATOR
                             Filed May 24, 1923
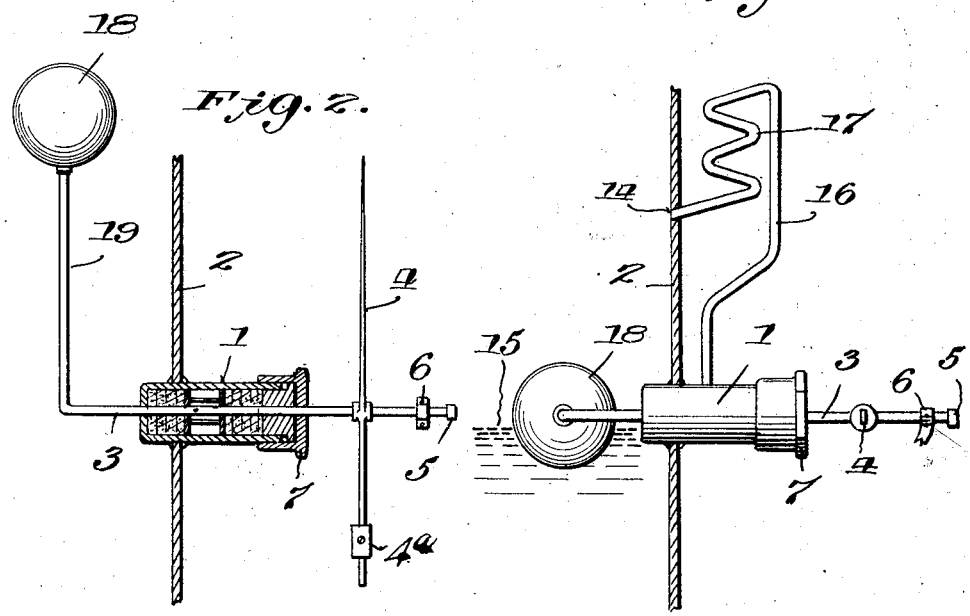

Patented Mar. 1, 1927.

1,619,553

UNITED STATES PATENT OFFICE.

FRANK E. WELLMAN, OF KANSAS CITY, KANSAS.

LIQUID-LEVEL INDICATOR.

Application filed May 24, 1923. Serial No. 641,100.

My invention relates to liquid level indicators, especially to an indicator for high pressure stills such as are used in cracking hydrocarbon oils, and is in the nature of an improvement on my Patent No. 1,525,762, in which is disclosed means for maintaining pressure in a hollow float to balance the pressure within the still. The object of the present invention is mainly to improve the pressure maintaining means, and secondarily to effect other simplifications and improvements which will appear as the present disclosure proceeds.

The invention is illustrated in the accompanying drawings in which:

Fig. 1 is a fragmental vertical section through the wall of a still to which the invention is applied.

Fig. 2 is a horizontal section through the device as mounted in a still wall.

Fig. 3 is an enlarged detail view in vertical, longitudinal section through the stuffing-box and bearing of the indicator shaft.

Referring to the drawings in detail, a stuffing box, arranged to be mounted in the wall 2 of a still and in which is journalled a tubular shaft 3 extending into the interior of the still where it is bent to form a float arm 19 which carries at its end a hollow float 18. This float is sealed except that its interior connects with the interior passage of the tubular shaft 3. The tubular shaft passes through the stuffing box on the outside of the still where it carries an indicator hand 4 having a counterbalance weight 4ª, and is journalled at its outer end 5 beyond the indicator hand in a suitable outside bearing support 6. The outer end 5 of the shaft 3 is sealed. A suitable gland nut 7 and compressing head 8 are provided for the outer end of the stuffing box for compressing the packing wads 9 and 10 which are held spaced apart near the center of the stuffing box by a spacing cage 11 to form a chamber 12. The interior of the hollow shaft communicates with this chamber through perforations 13 in the shaft, while the chamber communicates with the interior of the still at a point 14, well above the liquid level 15, through a pipe 16 and a reflux condenser or back-trap 17 formed in a bend in the pipe.

Having thus described my invention, what I claim and desire to secure in Letters Patent is:

1. A liquid level indicator for high pressure stills comprising a hollow float, a tubular arm and rock-shaft supporting said float and communicating with the interior thereof, a stuffing box for said shaft arranged to be mounted in the wall of the still, said shaft extending through the stuffing box and having its end sealed beyond the stuffing box, indicating means mounted on said shaft outside the stuffing box, a chamber within the stuffing box in communication with the interior of said tubular shaft and means connecting said chamber with the interior of the still.

2. A liquid level indicator for high pressure stills comprising a hollow float with a tubular arm and rock-shaft therefor, a stuffing box for the shaft arranged to be mounted in the wall of the still, an indicator hand mounted on said shaft outside the stuffing box, means forming a chamber within the stuffing box, said tubular shaft having its interior in communication with said chamber and sealed at a point beyond the chamber, means connecting said chamber with the interior of the still, and a back-trap in said connecting means discharging into the still.

3. A liquid level indicator for high pressure stills comprising a hollow float having a tubular arm and crank shaft therefor arranged to extend through the wall of the still, a stuffing box for journaling the shaft in the still wall, packing in the stuffing box, a spacer arranged to separate the packing intermediate the ends of the stuffing box to form a chamber, said tubular shaft communicating with the chamber thus formed, and means for equalizing the pressure in the chamber and the still, the said shaft having indicating means mounted thereon outside the stuffing box.

In testimony whereof I hereunto affix my signature.

FRANK E. WELLMAN.